Figure 1:
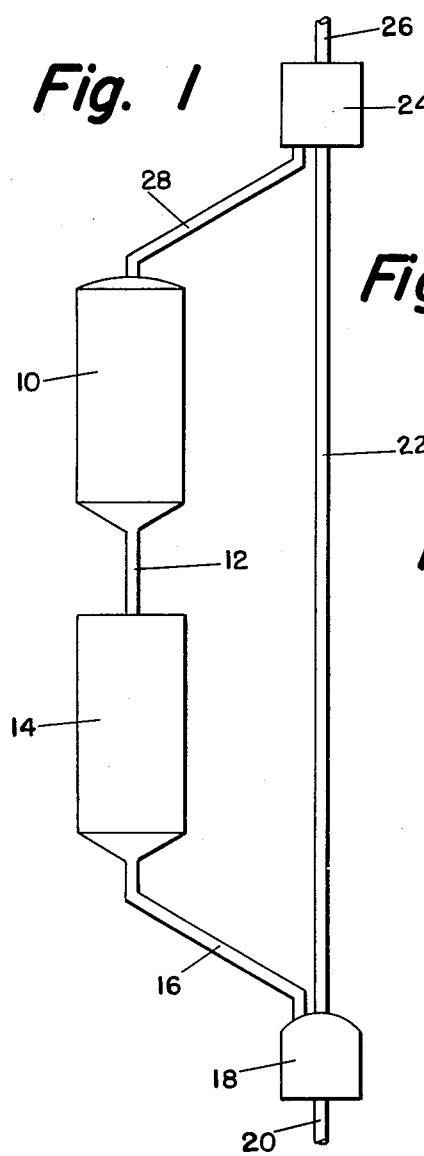

Sept. 15, 1964  W. L. McCLURE  3,149,064
CONTACTING OF GAS WITH GRANULAR SOLID MATERIAL
Filed Feb. 5, 1960

INVENTOR.
WILLIAM L. MC CLURE
BY Robert O. Spindle
ATTORNEY

United States Patent Office 3,149,064
Patented Sept. 15, 1964

3,149,064
CONTACTING OF GAS WITH GRANULAR
SOLID MATERIAL
William L. McClure, Toledo, Ohio, assignor to Sun Oil
Company, Philadelphia, Pa., a corporation of New
Jersey
Filed Feb. 5, 1960, Ser. No. 7,036
10 Claims. (Cl. 208—165)

This invention relates to contacting gaseous materials with a granular solid contact material and is particularly well adapted to the introduction of gaseous reactants into reaction vessels wherein the gases undergo chemical reaction promoted by thermal or catalytic effects of the granular solid contact material. The term gaseous material, or gas, as used in the present application will be understood to refer to either normally gaseous material or to vaporized normally liquid material.

In processes for the catalytic conversion of hydrocarbon material by contact with granular solid contact material, the solid material is frequently introduced into the reaction zone at an elevated temperature in order to supply heat for the reaction. The gaseous material is frequently introduced at a lower temperature than that of the solid material.

The present invention relates to processes wherein the solid contact material is passed downwardly by gravity as a compact bed through a reaction vessel and wherein the gaseous material is introduced into the bed of solids to pass either upwardly or downwardly through the bed and undergo conversion. An important consideration in such processes is the proper distribution of gaseous material over the horizontal cross section of the bed of solids.

In the prior art a zone for the contacting of gaseous material and solid material has been formed by passing the solid material downwardly through a plurality of conduits having open lower ends and then into a compact bed of solids moving by gravity and having its upper surface substantially at the lower ends of the conduits. Gaseous material is then introduced into a plenum chamber surrounding the conduits and passes downwardly into the bed of solids. A difficulty which arises in connection with such operation is that the gas thus introduced into the bed of solids is mainly contacted with those particles in the bed which are not directly beneath the lower ends of the solids conduits. The solids in the moving bed which are directly beneath the lower ends of the conduits are contacted less with the introduced gaseous material and are consequently at a higher temperature than those solids which are not beneath the lower ends of the conduits. This fact causes poor temperature distribution over the horizontal cross section of the bed of solids, and this poor distribution results in detrimental effects in the conversion, as known in the art.

The present invention provides a novel manner of overcoming these disadvantages of prior art operation, and makes it possible to obtain greatly improved uniformity of temperature distribution over the horizontal cross section of a bed of compact solids moving by gravity.

Figure 2:
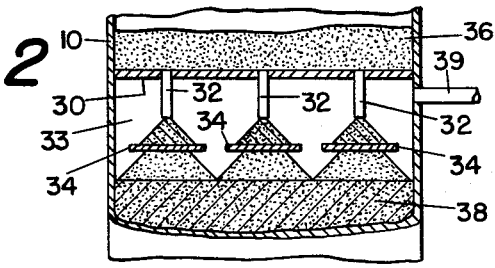
Figure 3:
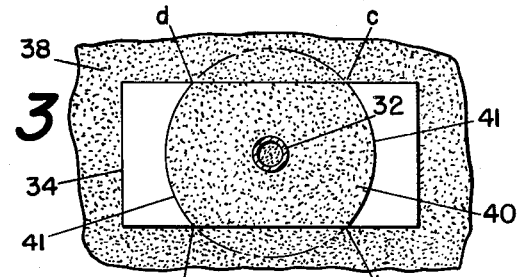
Figure 4:
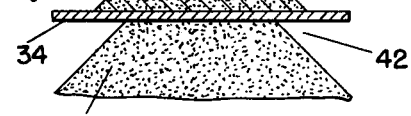
Figure 5:
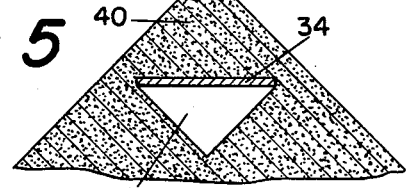
Figure 6:
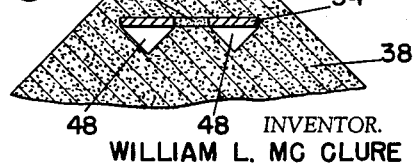

The invention will be described with reference to the attached drawing wherein FIGURE 1 is a schematic diagram of a catalytic conversion system to which the invention is applicable, FIGURE 2 is a sectional elevational view of a portion of the reaction vessel in such system, FIGURES 3, 4, and 5 are sectional plan, elevational and side views respectively of a solids conduit and associated apparatus according to the invention, and FIGURE 6 is a sectional side view of a modification of the apparatus shown in FIGURES 3, 4, and 5.

In FIGURE 1 there are shown a reaction vessel 10, regeneration vessel 14 for granular solids, an engager vessel 18 for initiating the pneumatic transfer of the solids, a pneumatic lift conduit 22 and a disengager vessel 24 for the pneumatic elevation system.

In operation granular solids are passed by gravity as a compact bed through vessel 10 and are contacted therein with hydrocarbon reactants introduced through means not shown. Hydrocarbon conversion products are removed from vessel 10 through additional means not shown. The granular solids on which carbon has been deposited during the reaction in vessel 10 are passed through conduit 12 into regeneration vessel 14 wherein they are contacted with oxygen under combustion conditions to burn carbon from the solids. The latter are then passed through conduit 16 into vessel 18 wherein they are contacted with lifting gas introduced through line 20. Lifting gas containing suspended solids passes through lift conduit 22 into vessel 24 wherein the solids are disengaged from the lifting gas, the latter then being removed through conduit 26. The separated solids pass as a compact mass moving by gravity through line 28 into vessel 10 to begin another cycle.

FIGURE 2 shows schematically apparatus according to the invention providing means for introducing hydrocarbon reactants into contact with granular solids in vessel 10. This apparatus comprises a tube sheet 30, a plurality of short solids conduits 32 each having its open upper end secured in the tube sheet and having its open lower end positioned somewhat above the upper surface of a baffle 34.

In operation, solids pass by gravity from the bed 36 above the tube sheet 30 through the conduits 32 into a plurality of piles of solids above the baffles 34. As subsequently described in connection with FIGURES 3, 4, and 5, the solids pass from the piles over a portion of the edges of the respective baffles into a lower compact bed 38. Hydrocarbon reactants are introduced through line 39 into the space 33 surrounding the conduits 32 and above the upper surface of the bed 38.

In FIGURES 3, 4, and 5, a solids conduit 32 and an associated baffle 34 are illustrated in more detail. The baffle 34 is seen to be rectangular and to have dimensions which result in the obstruction of solids issuing from conduit 32 in certain directions, while permitting the flow of such solids over the edges of the baffle in other directions. The solids issuing from conduit 32 form a pile 40 on the baffle 34, and the outer edges of the pile are represented in plan by the numerals 41. The locations of the edges 41 are determined by the static angle of repose of the granular solids. This angle is a well recognized phenomenon in the flow of granular solids, and there is a characteristic angle which is essentially constant for a given mixture of granular solids. Frequently the angle of repose is in the vicinity of 30°.

From FIGURE 3, it is seen that the upper surface of the baffle 34 is intersected by two portions of an imaginary circular line which defines, at the level of the upper surface of the baffle, the outer limit of travel of solids at the static angle of repose upon issuance from the lower end of the conduit 32. The edges 41 are represented by the arcs ad and bc in FIGURE 3, and the sum of the arcs ad and bc represents that portion of the imaginary line referred to above which intersects the upper surface of the baffle. The dashed lines cd and ab in FIGURE 3 are arcs representing in sum that portion of the imaginary line referred to above which does not intersect the upper surface of the baffle.

In accordance with the present invention, the upper surface of the baffle is intersected by 10 to 80% of the imaginary line referred to above. This provides at least 20% of circumference which is available for the passage of granular solids over the edges of the baffle. Preferably the upper surface of the baffle is intersected by less than 50% of the imaginary line referred to above, so that more than 50% of the circumference is available for passage of solids over the edges of the baffle. This permits a relatively high throughput of solids through the system.

It is seen from FIGURE 3 that passage of solids in certain directions is permitted while preventing passage of solids in the perpendicular directions. As a result a space 42 is provided beneath the baffle 34 and above the upper surface of the bed 38. This space extends longitudinally beneath the baffle 34 and communicates at both ends with the space 33 which, as shown in FIGURE 2, is in communication with the hydrocarbon inlet 39. Accordingly the hydrocarbons which are introduced through conduit 39 are enabled to pass into the space 42 and to come in contact therein with the upper surface of a compact bed directly beneath the lower end of the conduit 32. This contact greatly improves the distribution of hydrocarbon vapors through the compact bed and eliminates problems of excessively great variation in temperature over the horizontal cross section of the bed.

In FIGURE 6, a modification is illustrated wherein an orifice 44 is provided in the baffle 34, this orifice being concentric with the conduit 32. A portion of the granular solids passes downwardly through the orifice 44 while the remainder passes over the edges of the baffle 34 in the same manner as that described previously in connection with FIGURES 3, 4, and 5. Two longitudinal spaces 48 are provided beneath the baffle 34 in place of the single space 42 provided by the apparatus shown in FIGURES 3, 4, and 5.

The apparatus of FIGURE 6 provides the same advantages as discussed previously and also permits a greater throughput of solids because of the additional space provided by the orifice 44 for the travel of granular solids from the pile 40 into the lower compact bed 38.

The baffle which is employed according to the invention preferably has a major dimension which is at least twice the major inner dimension of the solids conduit beneath which it is positioned. The upper limit of the ratio of the major dimension of the baffle to the major dimension of the conduit is not critical but typically this ratio is less than 5. The minor dimension of the baffle is typically in the range from 1.5 to 2.0 times the major inner dimension of the conduit. Preferably the distance between the upper surface of the baffle and the lower end of the conduit beneath which it is positioned is in the range from 0.4 to 1.0 times the major inner dimension of the conduit.

The above dimensions and proportions are not critical, and it will readily be seen by a person skilled in the art that considerable variation is possible while still providing the essential feature of the invention, namely that the upper surface of the baffle is intersected by 10 to 80% of the imaginary line referred to previously.

The shape of the baffle is also not critical, and many variations will suggest themselves to the person skilled in the art, all of which provide the essential feature of the invention as noted above. From the standpoint of simplicity and highly satisfactory performance, a baffle which is relatively elongated in one direction and relatively short in the other direction, and in particular a rectangular baffle, is preferred for use according to the invention.

In the case where an aperture is provided in the baffle, the major dimension of the cross section of the aperture is preferably in the approximate range from 0.5 to 0.9 times the major inner dimension of the conduit beneath which it is located.

Any suitable distribution over the horizontal cross section can be provided for the conduits 32 and associated baffles 34. It is also within the scope of the invention to provide only one such conduit 32 and baffle 34 at a given level in the apparatus.

In a typical example of a process according to the invention, a petroleum gas oil boiling in the range from 200 to 750° F. is vaporized and introduced at a temperature of 780° F. into apparatus as illustrated in the drawing. Six-inch diameter conduits 32 are provided, and 10 inch by 16 inch plates 34 with 4½ inch diameter central holes 44 are spaced 3¼ inches from the lower ends of the conduits 32. The gas oil vapors are contacted with 4 to 8 mesh granular cracking catalyst of the synthetic silica-alumina type, the temperature of introduction of the catalyst being about 1000° F. The pressure in the reaction vessel is about 10 p.s.i.g. The catalyst circulation rate is about 300 tons per hour and the hydrocarbon vapor charge rate is about 18,000 barrels per day.

The temperature distribution in the catalyst bed is satisfactorily uniform and a good rate of conversion to the desired gasoline product is obtained while minimizing the production of undesired materials such as gases and coke. The ratio of the desired gasoline product to the undesired products is substantially higher than in a conventional process wherein the catalyst passes directly from the conduits 32 onto the upper surface of the bed 38 as illustrated in FIGURE 2.

The invention is applicable generally to the known processes for contacting of gaseous materials with moving compact beds of granular solids, usually at a temperature in the range from 800 to 1200° F. Synthetic silica-alumina and activated clay cracking catalysts, and various inert heat transfer materials are examples of suitable solid materials which may be employed in such processes, but the invention is also applicable to other known types of solid materials.

The nature of the gaseous material which is contacted with the solids according to the invention is not critical and the invention is applicable generally to gaseous materials which are known for use in such processes, e.g. petroleum fractions which are subjected to cracking or other conversions, oxygen-containing gases for use in regeneration of granular solids, etc.

The invention claimed is:

1. Apparatus for contacting gas with solids which comprises a vessel; a conduit for gravitating compact granular solids having its lower end within said vessel, an oblong transverse baffle so positioned within said vessel and beneath the lower end of the conduit that an imaginary cone extending downwardly from the lower end of said conduit at an angle of 30° with the horizontal intersects said baffle in a first arc spaced from one end of said baffle and in a second separate arc spaced from the opposite end of said baffle, the sum of the two arcs constituting 10 to 80% of the circumference of the circle of which they are parts, said vessel enclosing a contacting space beneath the lower end of said conduit, and means for introducing gas into said contacting space.

2. Apparatus according to claim 1 wherein the baffle has an aperture therein beneath the lower end of the conduit which aperture has lesser cross sectional area than that of the conduit.

3. Apparatus according to claim 1 wherein said baffle is rectangular and concentric with said conduit.

4. Apparatus according to claim 1 wherein the distance between the upper surface of the baffle and the lower end of the conduit is in the range from 0.4 to 1.0 times the major inner dimension of the conduit.

5. Apparatus according to claim 4 wherein the major horizontal dimension of the baffle is at least twice the major inner dimension of the conduit, and the minor dimension of the baffle is in the range from 1.5 to 2.0 times the major inner dimension of the conduit.

6. Apparatus according to claim 1 wherein a plurality of such conduits and baffles are spaced apart over the horizontal cross section of the apparatus.

7. Apparatus according to claim 1 wherein the baffle has a continuous upper surface.

8. Apparatus according to claim 1 wherein said sum of said two arcs constitutes 10 to 50% of said circumference.

9. Process for contacting gas with solids which comprises passing granular solids downwardly by gravity through a confined zone and then onto a pile of solids on the upper surface of a baffle, withdrawing solids laterally and then downwardly from the pile in a portion of the circumference of said pile comprising 10 to 80% of the total circumference while baffling the flow to prevent lateral and downward movement in a portion constituting the remainder of the circumference, passing solids downwardly and inwardly beneath the pile as a compact bed having an upper surface beneath the pile, introducing gas into a zone surrounding said compact bed, whereby gas passes horizontally from that zone into the communicating space beneath the pile and above the upper surface of the compact bed.

10. Process according to claim 9 wherein a portion of the solids introduced into the pile is passed down by gravity through a confined central passageway into the compact bed.

References Cited in the file of this patent
UNITED STATES PATENTS

| | | |
|---|---|---|
| 2,736,686 | Weber | Feb. 28, 1956 |
| 2,766,186 | Nadro | Oct. 9, 1956 |
| 2,846,369 | Halik | Aug. 5, 1958 |
| 2,956,009 | Bergstrom et al. | Oct. 11, 1960 |